(12) United States Patent
Wang

(10) Patent No.: US 11,716,123 B2
(45) Date of Patent: Aug. 1, 2023

(54) SYSTEMS, METHODS, AND MEDIA FOR RECOVERING DATA SYMBOLS IN MULTIPLE-INPUT, MULTIPLE-OUTPUT RECEIVERS

(71) Applicant: The Trustees of Columbia University in the City of New York, New York, NY (US)

(72) Inventor: Xiaodong Wang, Ramsey, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 17/067,281

(22) Filed: Oct. 9, 2020

(65) Prior Publication Data
US 2021/0111769 A1    Apr. 15, 2021

Related U.S. Application Data

(60) Provisional application No. 62/913,087, filed on Oct. 9, 2019.

(51) Int. Cl.
*H04B 7/04*        (2017.01)
*H04B 7/0417*     (2017.01)
(Continued)

(52) U.S. Cl.
CPC ......... *H04B 7/0421* (2013.01); *H04B 7/0434* (2013.01); *H04B 7/0478* (2013.01)

(58) Field of Classification Search
CPC .. H04B 7/0413; H04B 7/0421; H04B 7/0434; H04B 7/0478
See application file for complete search history.

(56) References Cited

U.S. PATENT DOCUMENTS 9,294,259 B2    3/2016   Jalloul et al.
9,414,371 B2    8/2016   Pi et al.
(Continued)

OTHER PUBLICATIONS

Alkhateeb, A., et al., "Channel estimation and hybrid precoding for millimeter wave cellular systems", In IEEE Journal of Selected Topics in Signal Processing, vol. 8, No. 5, Oct. 2014, pp. 831-846.
(Continued)

*Primary Examiner* — Nader Bolourchi
(74) *Attorney, Agent, or Firm* — Byrne Poh LLP

(57) ABSTRACT

Mechanisms for recovering data symbols in multiple-input, multiple-output (MIMO) receivers, the mechanisms comprising receiving, at $N_a$ antennas that each have an output: first signals corresponding to $N_p$ pilot symbols transmitted from each of K transmitters for a total of $N_p*K$ transmitted pilot symbols; and second signals corresponding to a plurality of transmitted data symbols transmitted from the K transmitters, wherein $N_p$ is less than $N_a$, and wherein K is less than $N_a$; receiving, at a hardware processor, first digital signals representing the $N_p*K$ transmitted pilot symbols; receiving, at the hardware processor, second digital signals representing the plurality of transmitted data symbols; and recovering the plurality of transmitted data symbols using the second digital signals and no more pilot symbols than the $N_p*K$ transmitted pilot symbols represented by the first digital signals using the hardware processor.

18 Claims, 7 Drawing Sheets

(51) Int. Cl.
H04B 7/0456 (2017.01)
H04B 7/0426 (2017.01)

(56) References Cited

U.S. PATENT DOCUMENTS

| | | | |
|---|---|---|---|
| 10,285,160 B2 | 5/2019 | Kyeong et al. | |
| 10,313,043 B2 | 6/2019 | Rodriguez-Herrera et al. | |
| 2014/0044043 A1* | 2/2014 | Moshfeghi | H04B 17/382 370/328 |
| 2015/0326286 A1 | 11/2015 | Wong et al. | |
| 2015/0326383 A1* | 11/2015 | Wong | H04B 7/0413 375/267 |
| 2016/0294532 A1* | 10/2016 | Masmoudi | H04L 5/1461 |
| 2017/0324455 A1 | 11/2017 | Soriaga et al. | |
| 2018/0323854 A1* | 11/2018 | Yang | H04L 25/0226 |
| 2019/0207785 A1* | 7/2019 | Choi | H04L 25/025 |

OTHER PUBLICATIONS

Ayach, O.E., et al., "Spatially sparse precoding in millimeter wave MIMO systems", In IEEE Transactions on Wireless Communications, vol. 13, No. 3, Mar. 2014, pp. 1499-1513.

Boccardi, F., et al., "Five disruptive technology directions for 5G", In IEEE Communications Magazine, vol. 52, No. 2, Feb. 2014, pp. 74-80.

Brady, J., et al., "Beamspace MIMO for millimeter-wave communications: System architecture, modeling, analysis, and measurements", In IEEE Transactions on Antennas and Propogation, vol. 61, No. 7, Jul. 2013, pp. 3814-3827.

Bussgang, J., "Crosscorrelation functions of amplitude-distorted Gaussian signals", Research Lab of Electronics, MIT, Technical Report No. 2016, Mar. 26, 1952, pp. 1-16.

Chu, H., et al., "Semi-blind millimeter-wave channel estimation using atomic norm minimization", In IEEE Communications Letters, vol. 22, No. 12, Dec. 2018, pp. 2535-2538.

Ding, Y., et al., "Bayesian channel estimation algorithms for massive MIMO systems with hybrid analog-digital processing and low-resolution ADCs", In IEEE Journal of Selected Topics in Signal Processing, vol. 12, No. 3, Jun. 2018, pp. 499-513.

Donoho, D. L., "Message-passing algorithms for compressed sensing", In Proc. Nat. Acad. Sci., vol. 106, No. 45, Nov. 2009, pp. 18914-18919.

Gao, Z., et al., "Compressive sensing techniques for next-generation wireless communications", In IEEE Wireless Communications, vol. 25, No. 3, Jun. 2018, pp. 144-153.

Han, S., et al., "Large-scale antenna systems with hybrid analog and digital beamforming for millimeter wave 5G", In IEEE Communications Magazine, vol. 53, No. 1, Jan. 2015, pp. 186-194.

He, H., et al., "Bayesian optimal data detector for hybrid mmwave MIMO-OFDM systems with low-resolution ADCs", In IEEE Journal of Selected Topics in Signal Processing, vol. 12, No. 3, Jun. 2018, pp. 469-483.

Heath, R.W., et al., "An overview of signal processing techniques for millimeter wave MIMO systems", In IEEE Journal of Selected Topics in Signal Processing, vol. 10, No. 3, Apr. 2016, pp. 436-453.

Hur, S., et al., "Proposal on millimeter-wave channel modeling for 5G cellular system", In IEEE Journal of Selected Topics in Signal Processing, vol. 10, No. 3, Apr. 2016, pp. 454-469.

Jacobsson, S., et al., "Quantized precoding for massive MU-MIMO", In IEEE Transactions on Communications, vol. 65, No. 11, Nov. 2017, pp. 4670-4684.

Jain, P., et al., "Low-rank matrix completion using alternating minimization", In Proceedings of the Forty-fifth Annual ACM Symposium on Theory of Computing. ACM, Jun. 2013, pp. 665-674.

Larsson, E.G., et al., "Massive MIMO for next generation wireless systems", In IEEE Communications Magazine, vol. 52, No. 2, Feb. 2014, pp. 186-195.

Li, Y., et al., "Channel estimation and performance analysis of one-bit massive MIMO systems", In IEEE Transactions on Signal Processing, vol. 65, No. 15, Aug. 2017, pp. 4075-4089.

Liang, S., et al., "On iterative compensation of clipping distortion in OFDM systems", In IEEE Wireless Communications Letters, vol. 8, No. 2, Apr. 2019, pp. 436-439.

Liu, A., and Lau, V., "Phase only RF precoding for massive MIMO systems with limited RF chains", In IEEE Transactions on Signal Processing, vol. 62, No. 17, Sep. 2014, pp. 4505-4515.

Liu, H., et al., "Super-resolution blind channel-and-signal estimation for massive MIMO with one-dimensional antenna array", In IEEE Transactions on Signal Processing, Jul. 2019, pp. 1-16.

Ma, J., and Ping, L., "Orthogonal AMP", In IEEE Access, vol. 5, Jan. 2017, pp. 2020-2033.

Mairal, J., et al., "Sparse modeling for image and vision processing", In Foundations and Trends in Computer Graphics and Vision, vol. 8, No. 2-3, Dec. 2014, pp. 85-283.

Marzetta, T.L., "Noncooperative cellular wireless with unlimited numbers of base station antennas", In IEEE Transactions on Wireless Communications, vol. 9, No. 11, Nov. 2010, pp. 3590-3600.

Max, J., "Quantizing for minimum distortion", In IRE Transactions on Information Theory, vol. 6, No. 1, Mar. 1960, pp. 7-12.

Mendez-Rial, R., et al., "Hybrid MIMO architectures for millimeter wave communications: Phase shifters or switches?" In IEEE Access, vol. 4, Jan. 2016, pp. 247-267.

Mo, J., et al., "Channel estimation in broadband millimeter wave MIMO systems with few-bit ADCs", In IEEE Transactions on Signal Processing, vol. 66, No. 5, Mar. 2018, pp. 1141-1154.

Mo, J., et al., "Hybrid architectures with few-bit ADC receivers: Achievable rates and energy-rate tradeoffs", In IEEE Transactions on Wireless Communications, vol. 16, No. 4, Apr. 2017, pp. 2274-2287.

Parker, J.T., et al., "Bilinear generalized approximate message passing—part II: Applications", In IEEE Transactions on Signal Processing, vol. 62, No. 22, Nov. 2014, pp. 5854-5867.

Parker, J.T., et al., "Bilinear generalized approximate message passing—part I: Derivation", In IEEE Transactions on Signal Processing, vol. 62, No. 22, Nov. 2014, pp. 5854-5867.

Price, R., "A useful theorem for nonlinear devices having gaussian inputs", In IRE Transactions on Information Theory, vol. 4, No. 2, Jun. 1958, pp. 69-72.

Rangan, S., "Generalized approximate message passing for estimation with random linear mixing", In Information Theory Proceedings (ISIT), 2011 IEEE international Symposium on, Jul. 2011, pp. 2168-2172.

Romanov, E., and Gavish, M., "Near-optimal matrix recovery from random linear measurements", In Proceedings of the National Academy of Sciences, vol. 115, No. 28, Jun. 2018, pp. 7200-7205.

Roth, K. and Nossek, J.A., "Achievable rate and energy efficiency of hybrid and digital beamforming receivers with low resolution ADC", In IEEE Journal on Selected Areas in Communications, vol. 35, No. 9, Sep. 2017, pp. 2056-2068.

Sanayei, S., and Nosratinia, A., "Antenna selection in MIMO systems", In IEEE Communications Magazine, vol. 42, No. 10, Oct. 2004, pp. 68-73.

Saxena, A. K., et al., "Analysis of one-bit quantized preceding for the multiuser massive MIMO downlink", In IEEE Transactions on Signal Processing, vol. 65, No. 17, Sep. 2017, pp. 4624-4634.

Stein, C.M., "Estimation of the mean of a multivariate normal distribution", In The Annals of Statistics, Nov. 1981, pp. 1135-1151.

Studer, C., and Durisi, G., "Quantized massive MU-MIMO-OFDM uplink", In IEEE Transactions on Communications, vol. 64, No. 6, Jun. 2016, pp. 2387-2399.

Takeuchi, K., et al., "On an achievable rate of large rayleigh block-fading MIMO channels with no CSI", In IEEE Transactions on Information Theory, vol. 59, No. 10, Oct. 2013, pp. 6517-6541.

Venkateswaran, V., and van der Veen, A., "Analog beamforming in MIMO communications with phase shift networks and online channel estimation", In IEEE Transactions on Signal Processing, vol. 58, No. 8, Aug. 2010, pp. 4131-4143.

Wang, G., et al., "Wideband on-chip RF MEMS switches in a BiCMOS technology for 60 GHz applications", In 2008 Interna-

(56) References Cited

OTHER PUBLICATIONS tional Conference on Microwave and Millimeter Wave Technology, vol. 3, Apr. 2008, pp. 1389-1392.

Wang, H., et al., "Bayesian optimal data detector for mmWave OFDM system with low-resolution ADC", In IEEE Journal on Selected Areas in Communications, vol. 35, No. 9, Sep. 2017, pp. 1962-1979.

Wen, C.K., et al., "Bayes-optimal joint channel-and-data estimation for massive MIMO with low-precision ADCs", In IEEE Transactions on Signal Processing, vol. 64, No. 10, May 2016, pp. 2541-2556.

Yan, W., and Yuan, X., "Semi-blind channel-and-signal estimation for uplink massive MIMO with channel sparsity", In IEEE Access, vol. 7, Jul. 2019, pp. 95008-95020.

Zhang, J., et al., "Blind signal detection in massive MIMO: Exploiting the channel sparsity", In IEEE Transactions on Communications, vol. 66, No. 2, Feb. 2018, pp. 700-712.

Zhang, J., et al., "On low-resolution ADCs in practical 5G millimeter-wave massive MIMO systems", In IEEE Communications Magazine, vol. 56, No. 7, Jul. 2018, pp. 205-211.

Hu, C., et al., "Super-resolution channel estimation for mmWave massive MIMO with hybrid precoding", In IEEE Transactions on Vehicular Technology, vol. 67, No. 9, Jun. 2018, pp. 8954-8958.

Huang, H., et al., "Deep learning for super-resolution channel estimation and DOA estimation based massive MIMO system", In IEEE Transactions on Vehicular Technology, vol. 67, No. 9, Sep. 2018, pp. 8549-8560.

Liang, S., et al., "Semi-Blind Detection in Hybrid Massive MIMO Systems via Low-Rank Matrix Completion", In IEEE Transactions on Wireless Communications, Aug. 2019, vol. 18, No. 11, pp. 5242-5254.

NSF Grant 1642920, "Energy- and Cost-Efficient Spectrum Utilization with Full-Duplex mm-wave Massive MIMO", Sep. 14, 2016, pp. 1-3.

Ratnam, V.V., et al., "Hybrid beamforming with selection for multiuser massive MIMO systems", In IEEE Transactions on Signal Processing, vol. 66, No. 15, May 2018, pp. 4105-4120.

Tan, W., et al., "Spectral and energy efficiency of massive MIMO for hybrid architectures based on phase shifters", In IEEE Access, vol. 6, Jan. 2018, pp. 11751-11759.

Wen, C. et al., "Deep Learning for Massive MIMO CSI Feedback", in IEEE Wireless Communications Letters, vol. 7, Issue 5, Mar. 22, 2018, pp. 748-751.

\* cited by examiner

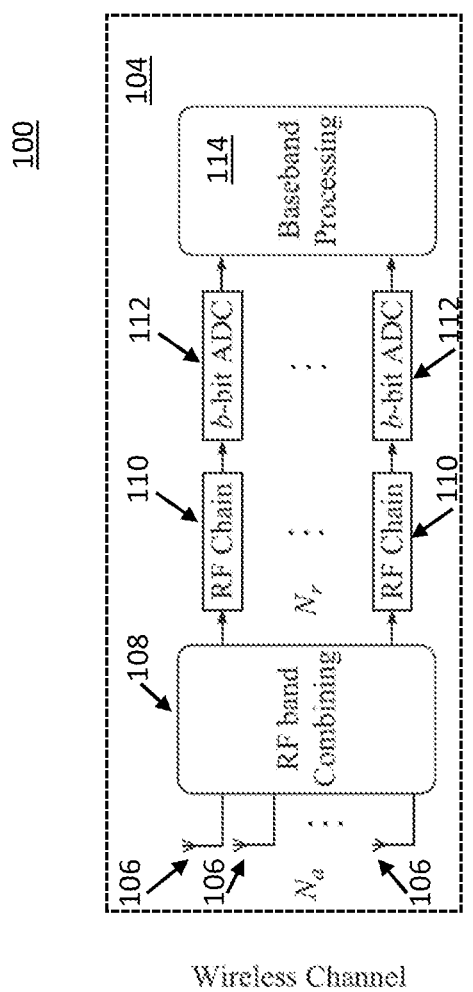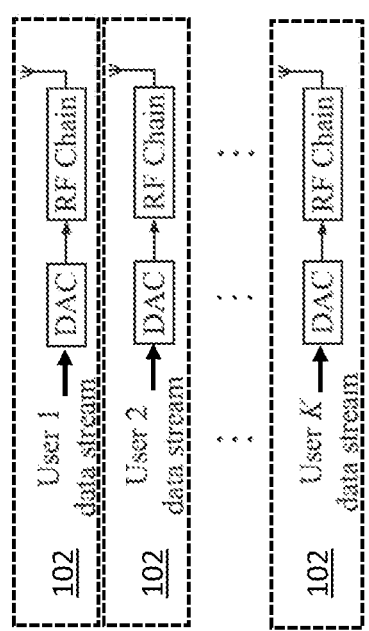
FIG. 1

Algorithm 1 R-ALS for Low-Rank Matrix Completion

1: Input $Y^{\Omega}$.
2: Initializing $\widehat{U}$ and $\widehat{V}$.
3: repeat
4:    for $i = 1 : T_c$ do
5:       $\widehat{V}(:,i) = \left(\Lambda \widehat{U}^H (\text{Diag}[E(:,i)]) \widehat{U} \Lambda + \lambda_V I\right)^{-1}$
                            $\Lambda \widehat{U}^H (\text{Diag}[E(:,i)]) Y^{\Omega}(:,i)$.
6:    end for
7:    for $n = 1 : N_a$ do
8:       $\widehat{U}(n,:) = Y^{\Omega}(n,:) (\text{Diag}[E(n,:)]) \widehat{V}^H \Lambda$
                        $\left(\Lambda \widehat{V} (\text{Diag}[E(n,:)]) \widehat{V}^H \Lambda + \lambda_U I\right)^{-1}$.
9:    end for
10: until Convergence

FIG. 3

412 → 6: Estimating H and X:

$$\forall n, i : S_{ni} = \left(Z_{ni}^{post} - Z_{ni}^{pri}\right)/\nu_{ni}^{pri}(Z), \quad (24a)$$

$$\nu_{ni}(S) = \left(1 - \nu_{ni}^{post}(Z)/\nu_{ni}^{pri}(Z)\right)/\nu_{ni}^{pri}(Z). \quad (24b)$$

$$\forall n, k \ \nu_{nk}(\tilde{H}) = \left(\sum_i |\hat{X}_{ki}|^2 \nu_{ni}(S)\right)^{-1}, \quad (25a)$$

$$\tilde{H}_{nk} = \nu_{nk}^{pri}(\tilde{H})\left(\sum_i \hat{X}_{ki}^* S_{ni}\right) +$$

$$\hat{H}_{nk}\left(1 - \nu_{nk}^{pri}(\tilde{H})\sum_i \nu_{ki}(\hat{X})\nu_{ni}(S)\right). \quad (25b)$$

$$\forall k, i \ \nu_{ki}(\check{X}) = \left(\sum_n |\hat{H}_{nk}|^2 \nu_{ni}(S)\right)^{-1}, \quad (26a)$$

$$\check{X}_{ki} = \nu_{ki}(\check{X})\left(\sum_n \hat{H}_{nk}^* S_{ni}\right) + \quad (26b)$$

$$\hat{X}_{ki}\left(1 - \nu_{ki}(\check{X})\sum_n \nu_{nk}(\hat{H})\nu_{ni}(S)\right). \quad (26c)$$

414 → 7: Refined estimation of H and X:

$$\forall n, k : \quad \hat{H}_{nk} = E[H_{nk}|\tilde{H}_{nk}, \nu_{nk}(\tilde{H})], \quad (27a)$$

$$\nu_{nk}(\hat{H}) = \text{Var}[H_{nk}|\tilde{H}_{nk}, \nu_{nk}(\tilde{H})]. \quad (27b)$$

$$\forall k, i : \quad \hat{X}_{ki} = E[X_{ki}|\check{X}_{ki}, \nu_{ki}(\check{X})], \quad (28a)$$

$$\nu_{ki}(\hat{X}) = \text{Var}[X_{ki}|\check{X}_{ki}, \nu_{ki}(\check{X})]. \quad (28b)$$

416 → 8: until Convergence

FIG. 4B

| Resolution $b$ | 1 | 2 | 3 | 4 | 5 |
|---|---|---|---|---|---|
| Stepsize $\Delta_b$ | 1.5956 | 0.9957 | 0.586 | 0.3352 | 0.1181 |
| NMSE | 0.3634 | 0.1188 | 0.03744 | 0.01154 | 0.001035 |

FIG. 5

SYSTEMS, METHODS, AND MEDIA FOR RECOVERING DATA SYMBOLS IN MULTIPLE-INPUT, MULTIPLE-OUTPUT RECEIVERS

CROSS-REFERENCE TO RELATED APPLICATION

This application claims the benefit of U.S. Provisional Patent Application No. 62/913,087, filed Oct. 9, 2019, which is hereby incorporated by reference herein in its entirety.

STATEMENT REGARDING GOVERNMENT FUNDED RESEARCH

This invention was made with government support under Grant CCF 1814803 awarded by the National Science Foundation and Grant N000141712827 awarded by the Office of Naval Research. The government has certain rights in the invention.

BACKGROUND

Massive multiple-input multiple-output (MIMO) refers to a communication system in which a large-scale antenna array is deployed at a base station (BS) to serve multiple users simultaneously. Massive MIMO can significantly increase capacity and energy efficiency through multi-user beamforming and is believed to be a key technology for next-generation communication systems. A practical obstacle for massive MIMO is the high cost and power consumption of high-resolution analog-to-digital converters (HR-ADCs) that are frequently used in the BS.

In a typical fully digital BS, each antenna is equipped with an individual radio frequency (RF) chain that contains an HR-ADC. When the number of antennas grows large, the related cost and power consumption of the HR-ADCs can be a heavy burden, rendering such fully digital system impractical for massive MIMO.

Hybrid analog/digital architectures and low-resolution ADC (LR-ADC) transceivers are two low cost and low power solutions that can be used to reduce this burden.

In hybrid analog/digital architectures, combining is divided into analog processing in RF band and digital processing in baseband. Analog and digital processing are connected by RF chains and ADCs, which are each much smaller in number than the number of antennas.

In low-resolution ADC (LR-ADC) transceivers, HR-ADCs are replaced with LR-ADCs to reduce the cost and power consumption, which grow exponentially with the resolution.

To achieve the performance gain offered by massive MIMO, it is crucial to use accurate channel state information (CSI) to recover transmitted symbols. However, conventional channel estimation algorithms based on pilot training for massive MIMO cannot be directly applied to systems equipped with the hybrid architecture or LR-ADCs because hybrid architectures reduce the number of RF chains and hence reduces the number of effective observations, and because LR-ADCs cause nonlinear distortions and additional interferences to the useful signals.

Accordingly, new mechanisms for recovering data symbols in multiple-input, multiple-output receivers are desirable.

SUMMARY

In accordance with some embodiments, mechanisms (which can include systems, methods, and media) for recovering data symbols in multiple-input, multiple-output receivers are provided.

In some embodiments, systems for recovering data symbols in a multiple-input, multiple-output (MIMO) receiver are provided, the systems comprising: $N_a$ antennas that each have an output, that receive first signals corresponding to $N_p$ pilot symbols transmitted from each of K transmitters for a total of $N_p*K$ transmitted pilot symbols, and that receive second signals corresponding to a plurality of transmitted data symbols transmitted from the K transmitters, wherein $N_p$ is less than $N_a$, and wherein K is less than $N_a$; an RF combiner having $N_a$ inputs and $N_r$ outputs, wherein each of the $N_a$ inputs is connected to the output of a unique one of the $N_a$ antennas; $N_r$ RF chains, wherein each of the $N_r$ RF chains has an input connected to a unique one of the $N_r$ outputs of the RF combiner, wherein each of the $N_r$ RF chains has an output, and wherein $N_r$ is less than $N_a$; $N_r$ b-bit analog to digital converters (ADCs), wherein each of the $N_r$ b-bit ADCs has an input connected to the output of a unique one of the $N_r$ RF chains, and wherein each of the $N_r$ b-bit ADCs has an output; and a hardware processor coupled to the output of each of the $N_r$ b-bit ADCs and configured to: receive first digital signals representing the $N_p*K$ transmitted pilot symbols; receive second digital signals representing the plurality of transmitted data symbols; and recover the plurality of transmitted data symbols using the second digital signals and no more pilot symbols than the $N_p*K$ transmitted pilot symbols represented by the first digital signals.

In some embodiments of these systems, $N_p$ equals K. In some embodiments of these systems, $N_p$ is less than half of $N_a$. In some embodiments of these systems, the RF combiner combines signals from the antennas using phase shifters. In some embodiments of these systems, the RF combiner uses switches to couple the $N_r$ RF chains to $N_r$ of the $N_a$ antennas. In some embodiments of these systems, recovering the plurality of transmitted data symbols includes performing low-rank matrix decomposition on the first digital signals and the second digital signals. In some embodiments of these systems, b is less than 5. In some embodiments of these systems, the hardware processor uses Bussgang's decomposition to linearize distortion in at least one of the first digital signals and the second digital signals. In some embodiments of these systems, recovering the plurality of transmitted data symbols includes estimating a K×K ambiguity matrix using the first digital signals.

In some embodiments, methods for recovering data symbols in a multiple-input, multiple-output (MIMO) receiver are provided, the methods comprising: receiving, at $N_a$ antennas that each have an output: first signals corresponding to $N_p$ pilot symbols transmitted from each of K transmitters for a total of $N_p*K$ transmitted pilot symbols; and second signals corresponding to a plurality of transmitted data symbols transmitted from the K transmitters, wherein $N_p$ is less than $N_a$, and wherein K is less than $N_a$; receiving, at a hardware processor, first digital signals representing the $N_p*K$ transmitted pilot symbols; receiving, at the hardware processor, second digital signals representing the plurality of transmitted data symbols; and recovering the plurality of transmitted data symbols using the second digital signals and no more pilot symbols than the $N_p*K$ transmitted pilot symbols represented by the first digital signals using the hardware processor.

In some embodiments of these methods, $N_p$ equals K. In some embodiments of these methods, $N_p$ is less than half of $N_a$. In some embodiments of these methods, recovering the plurality of transmitted data symbols includes performing low-rank matrix decomposition on the first digital signals and the second digital signals. In some embodiments of these methods, further comprising using Bussgang's decomposition to linearize distortion in at least one of the first digital signals and the second digital signals. In some embodiments of these methods, recovering the plurality of transmitted data symbols includes estimating a K×K ambiguity matrix using the first digital signals.

In some embodiments, non-transitory computer-readable media containing computer executable instructions that, when executed by a processor, cause the processor to perform a method for recovering data symbols in a multiple-input, multiple-output (MIMO) receiver are provided, the method comprising: receiving, at $N_a$ antennas that each have an output: first signals corresponding to $N_p$ pilot symbols transmitted from each of K transmitters for a total of $N_p*K$ transmitted pilot symbols; and second signals corresponding to a plurality of transmitted data symbols transmitted from the K transmitters, wherein $N_p$ is less than $N_a$, and wherein K is less than $N_a$; receiving, at a hardware processor, first digital signals representing the $N_p*K$ transmitted pilot symbols; receiving, at the hardware processor, second digital signals representing the plurality of transmitted data symbols; and recovering the plurality of transmitted data symbols using the second digital signals and no more pilot symbols than the $N_p*K$ transmitted pilot symbols represented by the first digital signals using the hardware processor.

In some embodiments of these non-transitory computer-readable media, $N_p$ equals K. In some embodiments of these non-transitory computer-readable media, $N_p$ is less than half of $N_a$. In some embodiments of these non-transitory computer-readable media, recovering the plurality of transmitted data symbols includes performing low-rank matrix decomposition on the first digital signals and the second digital signals. In some embodiments of these non-transitory computer-readable media, the method further comprises using Bussgang's decomposition to linearize distortion in at least one of the first digital signals and the second digital signals. In some embodiments of these non-transitory computer-readable media, recovering the plurality of transmitted data symbols includes estimating a K×K ambiguity matrix using the first digital signals.

BRIEF DESCRIPTION OF THE DRAWINGS

FIG. 1 is an example of a massive MIMO system including K user devices and a base station in accordance with some embodiments.

FIG. 3 is an example of a regularized alternating least squares (R-ALS) algorithm that can be executed by a hardware processor to recover data signal in accordance with some embodiments.

FIGS. 4A and 4B are an example of a bilinear generalized AMP (BiG-AMP) algorithm that can be executed by a hardware processor to recover data signal in accordance with some embodiments.

FIG. 5 is an example of a table showing example values of stepsize $\Delta_b$ and minimum normalized MSE (NMSE) for different resolutions b of ADCs in accordance with some embodiments.

DETAILED DESCRIPTION

Figure 2A:
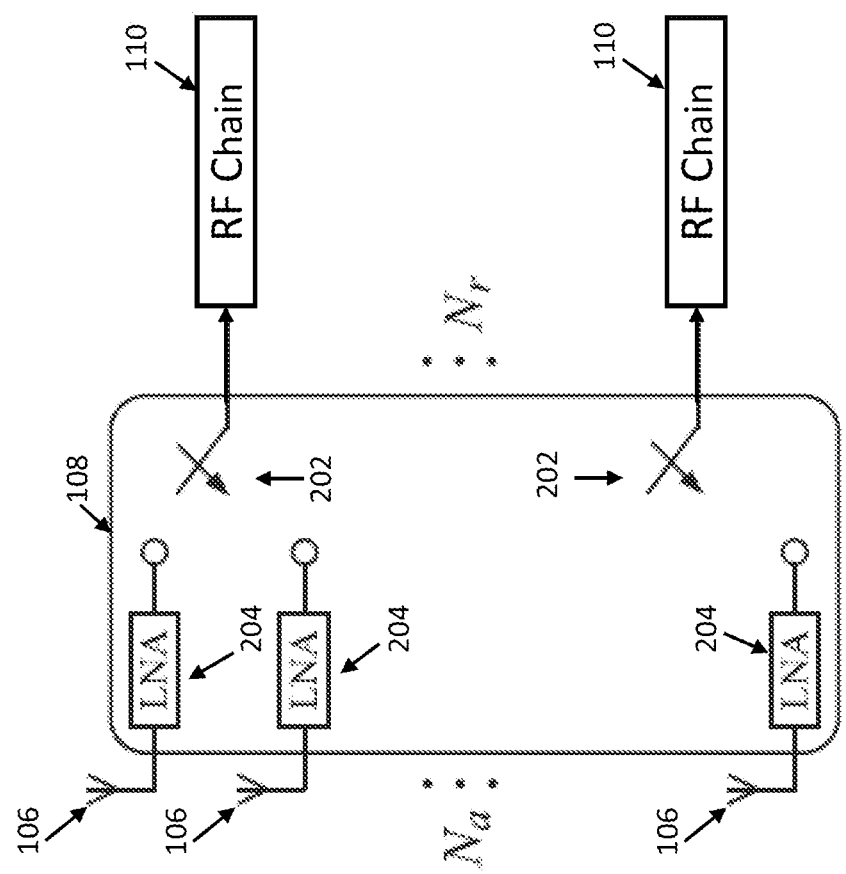
FIG. 2A is an example of a portion of a base station using switches in an RF band combining circuit in accordance with some embodiments.

In accordance with some embodiments, mechanisms (which can include systems, methods, and media) for recovering data symbols in multiple-input, multiple-output receivers are provided.

In some embodiments a semi-blind detection technique is provided for data detection without knowing a channel estimate in an uplink multi-user system. In some embodiments, this technique exploits a received signal corresponding to both a pilot payload and a data payload for data recovery via a low-rank matrix completion formulation.

Two iterative algorithms are introduced in connection with FIGS. 3 and 4 to solve the low-rank matrix completion problem: 1) regularized alternating least squares (R-ALS); and 2) bilinear generalized approximate message passing (BiG-AMP).

Uppercase and lowercase boldface letters are used herein to denote matrices and column vectors, respectively. The format $\Delta_{ij}$ denotes the (i,j)-th entry of A and $\Delta_{ij}^*$ denotes the conjugate of $\Delta_{ij}$. The format A(i, :) and A(:, j) denote the i-th row and j-th column of A, respectively. The format $A^T$, $A^H$ and $A^\dagger$ denote the transpose, conjugate transpose, and Moore-Penros pseudo-inverse of A, respectively. The format Diag(d) returns a diagonal matrix whose diagonal elements are given by a vector d. The format E(•) represents the expectation and the format Var(•) represents the corresponding variance. The probability density function of a real or complex Gaussian distribution x with mean μ and variance $\sigma^2$ is denoted as $\mathcal{N}(x;\mu,\sigma^2)$ or $\mathcal{CN}(x;\mu,\sigma^2)$, respectively. In particular, $\phi(x) \triangleq \mathcal{N}(x; 0,1)$ and $\Phi(x) \triangleq \int_{-\infty}^{x} \mathcal{N}(x; 0,1)dx$. Finally, $j=\sqrt{-1}$ and sign(•) is the sign function.

Turning to FIG. 1, an example 100 of a single-cell multi-user MIMO uplink system with a hybrid architecture is illustrated. As shown, system 100 includes K single-antenna user devices 102 served by a base station (BS) 104 equipped with $N_a$ antennas 106.

Any suitable number K (including 0, 1, 2, 3, ...) of user devices 102 can used in some embodiments. For example, K can be any number less than half of $N_a$ in some embodiments. Any type of user devices 102 can be used in some embodiments. For example, in some embodiments, the user devices can be transmitters or transceivers in any suitable user device such as a mobile phone, a mobile hot spot, a portable computer (such as a laptop, a tablet computer, etc.), an Internet of Things (IoT) device, such as a smart switch, a smart camera, a smart outlet, a smart speaker, a smart display, a smart thermostat, a smart doorbell, a smart camera, etc., and/or any other device containing a transmitter or transceiver.

Although only one BS 104 is shown in FIG. 1, any suitable number of BSs can be used in some embodiments.

Any suitable number $N_a$ of antennas 106 can be used in some embodiments. For example, $N_a$ can be 64, 128, or 256, in some embodiments.

As shown in FIG. 1, BS 104 can employ an analog structure with an RF band combining circuit 108 and $N_r$ RF chains 110 to combine the incoming signal in the RF band.

Any suitable number $N_r$ of RF chains can be used in some embodiments. For example, $N_r$ can be 32, 40, or any number up to the number of antennas ($N_a$) in some embodiments.

In some embodiments, each RF chain 110 can be followed by (or contain) a b-bit ADC 112. Any suitable type of ADC can be used for ADC 112, each ADC can have any suitable number of bits, and each ADC can have any suitable sampling rate, in some embodiments. For example, in some embodiments, each ADC 112 can sample the signal at its input at a rate of at least two times the system bandwidth (e.g., 2.5 times, 3 times, etc.). As another example, in some embodiments, b can be 1, 2, 3, 4, 5, or any other suitable number.

The output of ADCs 112 can be processed by baseband processing circuit 114. Baseband processing circuit 114 can be any suitable component(s) for processing the outputs of ADCs 112. For example, in some embodiments, circuit 114 can be a hardware processor, such as a microprocessor, a digital signal processor, a suitably programmed programmable gate array (PGA), etc. coupled to any suitable memory (e.g., such as random access memory, read only memory, flash memory, a disk drive (which can be solid state or not), and/or any other suitable memory).

Signals, which can include pilot symbols and data symbols, transmitted from user devices 102 and received and processed by BS 104 will now be described mathematically. Such signals can be modulated in any suitable manners, such as using Quadrature Phase Shift Keying (QPSK) modulation. Any suitable pilot symbols can be transmitted, and the pilot symbols can be known in advance of transmission to both the user devices and the BS in some embodiments.

Let $x[i] \in \mathbb{C}^{K \times 1}$ be a vector of transmitted signal(s) from K user device(s) 102 at time slot i with unit average power. In accordance with some embodiments, the received signal(s) $r[i] \in \mathbb{C}^{N_a \times 1}$ across $N_a$ BS antennas 106 can be given by $$r[i]=Hx[i]+n[i], \quad 1 \leq i \leq T_c, \tag{1}$$

where $n[i] \sim \mathcal{CN}(0, \sigma^{-2} I)$ is independent and identically distributed (i.i.d.) complex Gaussian noise and $H \triangleq [h_1, h_2, \ldots, h_K] \in \mathbb{C}^{N_a \times K}$ is the block fading channel matrix between K user devices 102 and BS 104. It can be assumed in some embodiments that H stays static within a coherence interval of $T_c$ and changes independently across different coherence intervals. In some embodiments, the channel of the k-th user can be modelled as $h_k \sim \mathcal{CN}(0, \beta_k I)$, where $\beta_k$ is the large-scale fading factor. In some embodiments, the channel matrix can be written as $H \equiv H'\Lambda$ with $\Lambda \triangleq \text{Diag}([\sqrt{\beta_1}, \sqrt{\beta_2}, \ldots, \sqrt{\beta_K}])$, where the entries of H' are distributed as $\{H'_{nk} \sim \mathcal{CN}(0,1), \forall n,k\}$. Since $\{\beta_k\}$ change slowly over time and can be estimated accurately, $\Lambda$ is assumed to be known at the BS in some embodiments.

Figure 2B:
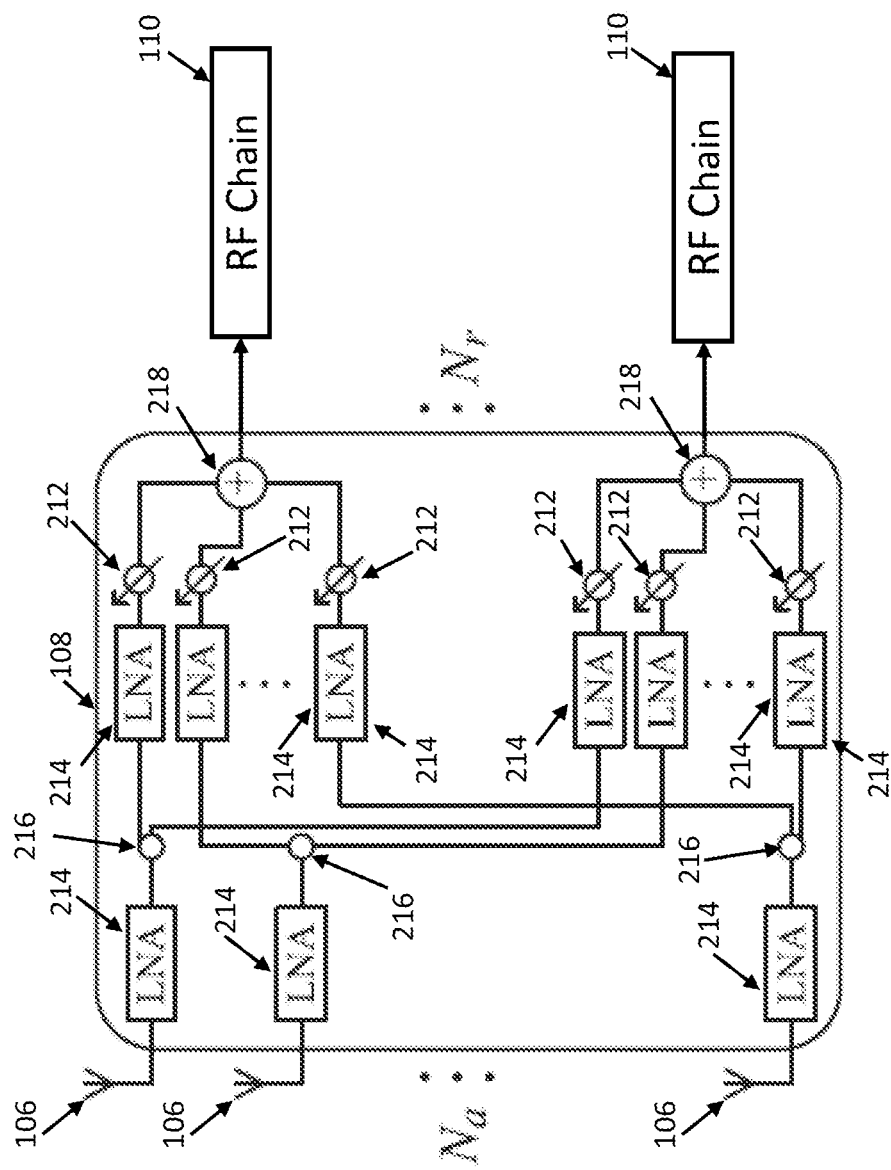
FIG. 2B is an example of a portion of a base station using phase shifters in an RF band combining circuit in accordance with some embodiments.

Upon reception at antennas 106, r[i] will pass through the analog structure and be combined in the RF band to get $y[i] \in \mathbb{C}^{N_r \times 1}$ as $$y[i]=W[i]r[i]=W[i]Hx[i]+W[i]n[i], \quad 1 \leq i \leq T_c, \tag{2}$$

where $W[i] \in \mathbb{C}^{N_r \times N_a}$ denotes the combing matrix of analog structures. In some embodiments, analog combining can be based on switches or phase shifters as shown in FIGS. 2A and 2B, respectively.

In accordance with some embodiments, the signal models of equations (1) and (2) can be formulated into a low-rank matrix completion problem. Signal detection can then be performed using matrix factorization solutions to the low-rank matrix completion problem in some embodiments.

In accordance with some embodiments, based on equation (1), X, N, and R can be defined as $X \triangleq [x[1], x[2], \ldots, x[T_c]] \in \mathbb{C}^{K \times T_c}$, $N \triangleq [n[1], n[2], \ldots, n[T_c]] \in \mathbb{C}^{N_a \times T_c}$ and $R \triangleq [r[1], r[2], \ldots, r[T_c]] \in \mathbb{C}^{N_a \times T_c}$. This gives equation (1) in a matrix form as $$R=HX+N=Z+N, \tag{9}$$

where $Z \triangleq HX \in \mathbb{C}^{N_a \times T_c}$.

In massive MIMO in some embodiments, both the number of antennas at the BS and the coherence time can be much larger than the number of users, i.e., $N_a, T_c \gg K$. As a result, Z can be a low-rank matrix. In some embodiments, Z can be defined as being a low-rank matrix when $\text{rank}[Z] \leq K \ll \min\{N_a, T_c\}$. In other words, in some embodiments, Z can be defined as being a low-rank matrix when its rank is less than or equal to the number of user devices, and the number of user devices is less than or equal to half of the lesser of the number of antennas in the BS and the number of time slots $T_c$ over which the pilot symbols and the data symbols are received. Note that no rank sparsity of H is assumed herein in some embodiments. The leveraged low-rank property of Z stems from the fact that $K \ll \min\{N_a, T_c\}$ in massive MIMO in some embodiments.

According to equation (2), $\{y[i], i=1, \ldots, T_c\}$ can be related to R via the following low-rank matrix completion formulations discussed in connection with FIGS. 2A and 2B below in some embodiments.

As shown in FIG. 2A, in some embodiments, each RF chain 110 can be coupled to one of $N_a$ antennas 106 through a switch 202 and a low noise amplifier 204. In some embodiments, in different time slots, each RF chain 110 can be coupled to a different antenna 106. The coupling between RF chains 110 and antennas 106 can be random, pseudo random, or according to a fixed schedule in some embodiments. This low-cost structure, known as antenna selection, can capture many advantages of massive MIMO and has low power consumption. Based on equations (2) and (9), a subset of entries in R can be observed, which include $\{y[i], \forall i\}$, in some embodiments. In some embodiments, the corresponding index set can be denoted as D. and $Y^\Omega$ can be defined as $Y^\Omega \in \mathbb{C}^{N_a \times T_c}$, whose entries in $\Omega$ are given by $\{y[i], \forall i\}$ and otherwise zeros.

For an arbitrary matrix $A \in \mathbb{C}^{N_a \times T_c}$, $\mathcal{P}_\Omega(A) \in \mathbb{C}^{N_a \times T_c}$ can be defined as $$\mathcal{P}_\Omega(A)_{ni} = \begin{cases} A_{ni}, & (n, i) \in \Omega \\ 0, & (n, i) \notin \Omega \end{cases}. \tag{10}$$

Then, $Y^\Omega = \mathcal{P}_\Omega(R)$. Based on (9) and (10), $Y^\Omega$ can be formulated as an incomplete observation of the low-rank matrix HX corrupted by the Gaussian noise N.

As shown in FIG. 2B, in some embodiments, each RF chain 110 can be connected to all antennas through phase shifters 212, LNAs 214, splitters 216, and combiners 218. Each element in W[i] represents a realization of a phase shifter, which can be modeled as $c \cdot \exp(j\theta)$. The constant c (which represents an attenuation) can the same for all phase shifters while the angle $\theta$ varies for different phase shifters in some embodiments. In some embodiments, W[i] can be given by $N_r$ row vectors randomly chosen from the $N_a \times N_a$ discrete Fourier transform (DFT) matrix F, whose elements are given by $$F_{m,n} = \frac{1}{\sqrt{N_a}} e^{\frac{j \cdot 2mn\pi}{N_a}}, \quad m, n = 0, \ldots, N_a - 1. \tag{11}$$

In other embodiments, designs for W[i] can include cyclically shifted Zadoff-Chu sequences that maximize spectral efficiency. A property of such W[i] in some embodiments is row-orthogonality.

Defining $\tilde{R} \triangleq FR$, $\tilde{H} \triangleq FH$ and $\tilde{N} \triangleq FN$ results in $\tilde{R} = \tilde{H}X + \tilde{N}$ from equation (9). Based on equation (2), $\{\tilde{R}_{ni}, \forall (n,i) \in \Omega\}$ can be observed to get $\{y[i], \forall i\}$. According to the definition of $Y^\Omega$ and the operator $\mathcal{P}_\Omega(\cdot)$ in equation (10), $Y^\Omega = \mathcal{P}_\Omega(\tilde{R})$. Since F is unitary, the distributions of $\tilde{H}$ and $\tilde{N}$ are the same as those of H and N, respectively. Then $Y^\Omega$ can be formulated as an incomplete observation of the low-rank matrix $\tilde{H}X$ corrupted by the Gaussian noise $\tilde{N}$.

For arbitrary $\{W[i]\}$, equation (2) can be transformed into the following low-rank matrix sensing problem:

$$y = \mathcal{A}(HX+N) = \mathcal{A}(HX) + \mathcal{A}(N), \quad (12)$$

where $y \triangleq [y[1]^T, \ldots, y[T_c]^T]^T \in \mathbb{C}^{N_r T_c \times 1}$ and $\mathcal{A}(\cdot): \mathbb{C}^{N_a T_c} \to \mathbb{C}^{N_r T_c \times 1}$ is the corresponding linear map. The second equality is due to the linearity of $\mathcal{A}(\cdot)$. After applying the noise whitening techniques to $\mathcal{A}(N)$, existing low-rank matrix recovery algorithms can be readily applied. For example, examples of low-rank matrix recovery algorithms that can be used in some embodiments are described in: H. Liu, X. Yuan, and Y. J. Zhang, "Super-resolution blind channel and-signal estimation for massive MIMO with one-dimensional antenna array," *IEEE Trans. Signal Process.*, vol. 67, no. 17, pp. 4433-4448, September 2019; P. Jain, P. Netrapalli, and S. Sanghavi, "Low-rank matrix completion using alternating minimization," in *Proc. 45th Annu. ACM Symp. Theory Comput.*, 2013, pp. 665-674; and E. Romanov and M. Gavish, "Near-optimal matrix recovery from random linear measurements," *Proc. Nat. Acad. Sci.*, vol. 115, no. 28, pp. 7200-7205, 2018, each of which is hereby incorporated by reference herein in its entirety.

A semi-blind detection method to recover X from $Y^\Omega$ without knowing H or $\tilde{H}$ is now described in accordance with some embodiments. Semi-blind in this context simply indicates that it is not necessary to know a channel estimate in order to recover X. H and $\tilde{H}$ can be mutually transformed to each other through the Discrete Fourier Transform (DFT) or Inverse Discrete Fourier Transform (IDFT) operations in some embodiments. With the abuse of notation, the related algorithms and analyses are presented using H below without differentiating with $\tilde{H}$, which does not affect estimating X from $Y^\Omega$.

Based on equations (9) and (10), the low-rank matrix completion problem can be formulated in some embodiments as $$(U^*, V^*) = \underset{\substack{U \in \mathbb{C}^{N_a \times K} \\ V \in \mathbb{C}^{K/T_c}}}{\operatorname{argmin}} \left\| Y^\Omega - \mathcal{P}_\Omega(U\Lambda V) \right\|_{\mathcal{F}}^2 + \lambda_U \|U\|_{\mathcal{F}}^2 + \lambda_V \|V\|_{\mathcal{F}}^2, \quad (13)$$

where $\|\cdot\|_F$ denotes Frobenius norm of the matrix.

Here, U* and V* correspond to the channel estimate $\hat{H}'$ and the data estimate $\hat{X}$, respectively. The regularization parameters $\lambda_U$ and $\lambda_V$ are used to incorporate the prior information of H' and X, respectively.

Note that the decomposition of $Z = U^*\Lambda V^*$ in equation (13) is not unique. For $Z = HX = H'\Lambda X$, there exists an invertible matrix $\Gamma \in \mathbb{C}^{K \times K}$ such that $H'\Lambda = U^*\Lambda\Gamma$ and $X = \Gamma^{-1}V^*$. Thus, solving equation (13) does not uniquely recover X in equation (9). Indeed, a sequence of pilot symbols are needed to estimate $\Gamma$ before estimating X. Since the dimension of $\Gamma$ is K×K, the number of pilot symbols needed can scale with K in some embodiments. In some embodiments, for example, the number of pilot symbols can be K or 2K.

Specifically, in some embodiments, pilot symbols are in the front of X as $X \equiv [P, D]$, where $D \equiv [x[T_p+1], \ldots, x[T_c]] \in \mathbb{C}^{K \times T_d}$ with $T_d = T_c - T_p$. After solving equation (13), $V^* = \Gamma X$ can be $$V^* \triangleq [V^*_p, V^*_d] = \Gamma[P, D], \quad (14)$$

where $V^*_p$ and $V^*_d$ correspond to P and D, respectively. In some embodiments, the pilot sequences are chosen to be orthogonal, i.e., $PP^H = I_{K \times K}$. From the pilot phase $V^*_p = \Gamma P$ in equation (14), $\Gamma$ can be $$\Gamma = V^*_p * P^H. \quad (15)$$

For the data phase $V^*_d = \Gamma D$ in equation (14), since $\Gamma$ is invertible, an estimate of D can be given by $$\hat{D} = \Gamma^{-1}V^*_d = P(V^*_p)^\dagger V^*_d. \quad (16)$$

Recalling that $H'\Lambda = U^*\Lambda\Gamma$, given equation (15), an estimate of $H = H'\Lambda$ can be given by $$\hat{H} = U^*\Lambda V^*_p P^H. \quad (17)$$

The channel estimator in equation (17) is based on the received signal corresponding to both P and D. The purpose of P in equations (16) and (17) is to remove the ambiguity of non-unique matrix factorization solutions. Intuitively, given P with a fixed $T_p$, the performance of channel estimator in equation (17) can be improved by increasing $T_d$ in some embodiments.

In connection with FIGS. 3 and 4, in accordance with some embodiments, two examples 300 and 400 of iterative algorithms to solve the low-rank matrix completion problem are presented. The first algorithm 300 is referred to herein as regularized alternating least squares (R-ALS). The second algorithm 400 is referred to herein as bilinear generalized AMP (BiG-AMP).

Turning to FIG. 3, an example of a regularized alternating least squares (R-ALS) algorithm 300 is shown. Algorithm 300 may be executed in baseband processing circuit 114 of FIG. 1, which circuit 114 may include a hardware processor. Algorithm 300 may be represented by hardware-processor-executable instructions stored in memory of baseband processing circuit 114 of FIG. 1, which memory can be couple to a hardware processor included in circuit 114.

As illustrated, at 302, algorithm 300 inputs $Y^\Omega$. Inputs $Y^\Omega$ can be received in any suitable manner in some embodiments. For example, in some embodiments, these inputs can be received as the outputs of ADCs 112 of FIG. 1.

Next, at 304, algorithm 300 can initialize $\hat{U}$ and $\hat{V}$. This initialization can be performed in any suitable manner. For example, in some embodiments, the elements of $\hat{U}$ and $\hat{V}$ can be drawn from i.i.d. Gaussian random variables with zero mean and unit variance. As another example, in some embodiments, first $\hat{U}$ and $\hat{V}$ are randomly initialized, and then the pilot positions in $\hat{V}$ are replaced with pilot symbols. As yet another example, in some embodiments, first denote $[U^\Omega, \Sigma^\Omega, V^\Omega] = \operatorname{svd}(Y^\Omega)$ as the singular value decomposition (SVD) of $Y^\Omega$, where $\Sigma^\Omega \in \mathbb{R}^{N_a \times T_c}$ is a diagonal matrix containing the singular values in a non-increasing order, and then initialize $\hat{U}$ and $\hat{V}$ with the first K columns of $U^\Omega$ and the first K rows of $V^\Omega$, respectively.

After initializing $\hat{U} \in \mathbb{C}^{N_a \times K}$ and $\hat{V} \in \mathbb{C}^{K \times T_c}$, R-ALS algorithm 300 alternately solves equation (13) for V and U while fixing the other as $$\hat{V} = \operatorname{argmin}_{V \in \mathbb{C}^{K \times T_c}} \|Y^\Omega - \mathcal{P}_\Omega(\hat{U} \Lambda V)\|_{\mathcal{F}}^2 + \lambda_V \|V\|_{\mathcal{F}}^2, \quad (18a)$$

$$\hat{U} = \operatorname{argmin}_{U \in \mathbb{C}^{N_a \times K}} \|Y^\Omega - \mathcal{P}_\Omega(U \Lambda \hat{V})\|_{\mathcal{F}}^2 + \lambda_U \|U\|_{\mathcal{F}}^2, \quad (18b)$$

where $\lambda_V$ and $\lambda_u$ are determined by the prior of X and H', respectively.

While the overall problem of equation (13) is non-convex, the sub-problems in equations (18a) and (18b) are convex and can be solved by regularized least squares. Specifically, define $E \in \mathbb{B}^{N_a \times T_c}$ as $$E_{ni} = \begin{cases} 1, & (n, i) \in \Omega \\ 0, & (n, i) \notin \Omega \end{cases} \quad (19)$$

Then for equation (18a), as shown in 308-312 of FIG. 3, each column of V can be optimized separately as equation (20) below.

$$\hat{V}(:, i) = \operatorname{argmin}_{V(:, i) \in \mathbb{C}^{K \times 1}} \quad (20)$$
$$\|Y^\Omega(:, i) - \operatorname{Diag}[E(:, i)] \hat{U} \Lambda V(:, i)\|_2^2 + \lambda_V \|V(:, i)\|_2^2 =$$
$$\left(\Lambda \hat{U}^H (\operatorname{Diag}[E(:, i)]) \hat{U} \Lambda + \lambda_V I\right)^{-1} \Lambda \hat{U}^H (\operatorname{Diag}[E(:, i)]) Y^\Omega(:, i)$$

Similarly, for equation (18b), as shown in 314-318 of FIG. 3, each row of $\hat{U}$ can be given by equation (21) below.

$$\hat{U}(n,:) = Y^\Omega(n,:)(\operatorname{Diag}[E(n,:)]) \hat{V}^H \Lambda (\Lambda \hat{V} (\operatorname{Diag}[E(n,:)])$$
$$\hat{V}^H \Lambda + \lambda_U I)^{-1} \quad (21)$$

Since the entries of H' and X have unit average power, $\lambda_V = \lambda_U = \sigma^2$. The R-ALS algorithm alternates between equations (20) and (21) in 306-320 iteratively until convergence of successive values of $\hat{V}$ and $\hat{U}$. For example, when $\hat{V}$ and $\hat{U}$ for adjacent passes of the repeat-until loop in 306-320 each do not change by more than some threshold amount, convergence can be considered to have occurred. Any suitable threshold can be used, such as 0.0001.

In some embodiments, the complexity of R-ALS algorithm 300 per iteration is dominated by matrix inversion, which scales as $\mathcal{O}(T_c K^3 + N_a K^3)$.

Figure 4A:
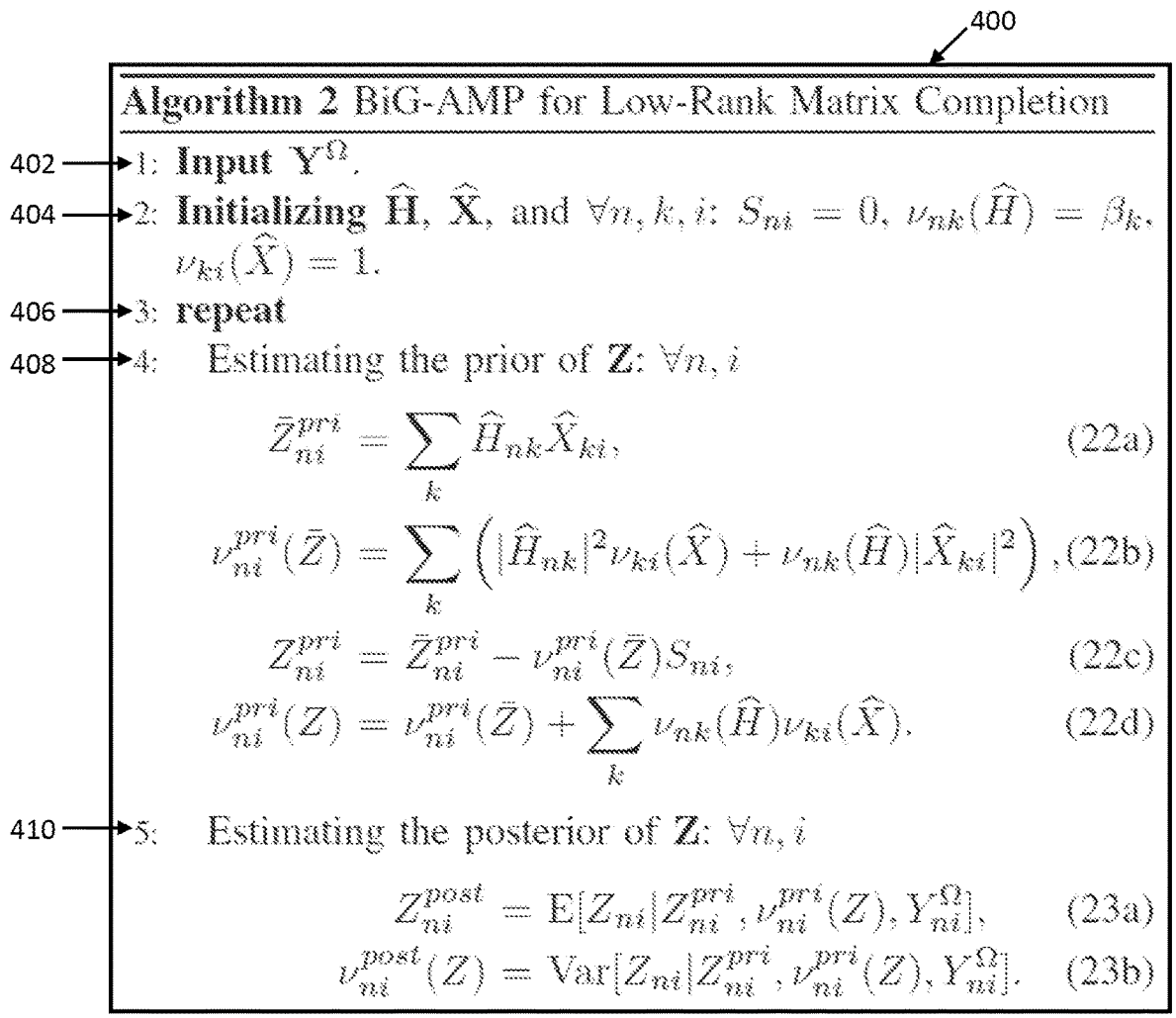

Turning to FIGS. 4A and 4B, an example of a bilinear generalized approximate message passing (BiG-AMP) algorithm 400 is shown. Algorithm 400 may be executed in baseband processing circuit 114 of FIG. 1, which circuit 114 may include a hardware processor. Algorithm 400 may be represented by hardware-processor-executable instructions stored in memory of baseband processing circuit 114 of FIG. 1, which memory can be couple to a hardware processor included in circuit 114.

In accordance with some embodiments, BiG-AMP algorithm 400 can be used to estimate the matrices H and X from a noisy (possibly incomplete) matrix observation $Y^\Omega$ of their product Z=HX. In some embodiments, the entries of H and X are assumed to be independently distributed as $$P_H(H) = \Pi_n \Pi_k P_H(H_{nk}), \quad (29a)$$

$$P_X(X) = \Pi_k \Pi_i P_X(X_{ki}). \quad (29a)$$

In some embodiments, the likelihood of the bilinear observation $Y^\Omega$ is assumed to be $$P_{Y^\Omega|Z}(Y^\Omega|Z) = \Pi_n \Pi_i P_{Y^\Omega|Z}(Y_{ni}^\Omega|Z_{ni}). \quad (30)$$

According to equations (9) and (10), $$P_{Y^\Omega|Z}(Y_{ni}^\Omega \mid Z_{ni}) = \begin{cases} \mathcal{CN}(Y_{ni}^\Omega; Z_{ni}, \sigma^2), & (n, i) \in \Omega, \\ \mathbb{1}_{Y_{ni}^\Omega}, & (n, i) \notin \Omega. \end{cases} \quad (31)$$

where $\mathbb{1}_Y$ denotes a point mass function at Y=0.

Based on equations (29) and (30), in some embodiments, the joint posterior distribution of H and X can be given by $$P_{HX|Y^\Omega}(H, X \mid Y^\Omega) = \frac{P_{Y^\Omega|Z}(Y^\Omega \mid Z) P_H(H) P_X(X)}{P_{Y^\Omega}(Y^\Omega)}, \quad (32)$$

where $$P_{Y^\Omega}(Y^\Omega) = \int\int P_{Y^\Omega|Z}(Y^\Omega \mid Z) P_H(H) P_X(X) dH dX. \quad (33)$$

In some embodiments, BiG-AMP algorithm 400 approximates the minimum mean-squared error (MMSE) estimates of H and X alternately based on $Y^\Omega$ and equation (32).

As illustrated, at 402, algorithm 400 inputs $Y^\Omega$. Inputs $Y^\Omega$ can be received in any suitable manner in some embodiments. For example, in some embodiments, these inputs can be received as the outputs of ADCs 112 of FIG. 1.

Next, at 404, algorithm 400 initializes $\hat{H}$ and $\hat{X}$. This initialization can be performed in any suitable manner in some embodiments. For example, in some embodiments, algorithm 400 can initialize $\hat{H} = \hat{U}A$ and $\hat{X} = \hat{V}$, where $\hat{U}$ and $\hat{V}$ use the initializations described above for algorithm 300. As another example, in some embodiments, algorithm 400 can perform best rank-K initialization.

Then, at 408, algorithm 400 can compute the prior distribution of Z=HX. This can be performed in any suitable manner in some embodiments. For example, this can be performed by solving equations (22a), (22b), (22c), and (22d) of FIG. 4A and in some embodiments. In equation (22a), $\overline{Z}^{pri}$ is a plug-in estimate of Z. In equation (22c), $Z^{pri}$ provides a refined estimate by introducing an "Onsager" term to handle the correlation among messages in iterative processing, which can improve the convergence and performance of iterative algorithms.

At 410, algorithm 400 can compute the posterior distribution of Z based on equations (30) and (31) and $Y^\Omega$. More particularly, with a Gaussian prior assumption $Z_{ni} \in \mathcal{N}(Z_{ni}; Z_{ni}^{pri}, v_{ni}^{pri}(Z))$, the posterior mean and variance in equations (23a) and (23b) can be given, respectively, by $$Z_{ni}^{post} = \begin{cases} Z_{ni}^{pri} + \frac{v_{ni}^{pri}(Z)}{v_{ni}^{pri}(Z) + \sigma^2}(Y_{ni}^\Omega - Z_{ni}^{pri}), & (n, i) \in \Omega, \\ Z_{ni}^{pri}, & (n, i) \notin \Omega, \end{cases} \quad (34)$$

$$v_{ni}^{post} = \begin{cases} \frac{v_{ni}^{pri}(Z) \cdot \sigma^2}{v_{ni}^{pri}(Z) + \sigma^2}, & (n, i) \in \Omega, \\ v_i^{pri}(Z), & (n, i) \notin \Omega. \end{cases} \quad (35)$$

For $(n,i) \notin \Omega$, since there is no observation for $Z_{ni}$, the posterior is the same as the prior.

Then, at 412, algorithm 400, using equations (24a) and (24b), first computes the residual S and its inverse variance.

Subsequently, given $\hat{X}$, using equations (25a) and (25b), algorithm 400 performs matched-filtering of S to get $\tilde{H}$, which can be interpreted as an additive white Gaussian noise (AWGN) observation of H with noise variance given by $v(\tilde{H})$. Alternately, in some embodiments, given $\tilde{H}$, using equations (26a), (26b), and (26c), algorithm 400 can compute the AWGN observation $\tilde{X}$ of X.

Next, at 414, using equations (27a) and (27b), algorithm 400 first performs the MMSE estimation of H from its AWGN observation $\tilde{H}$ and $P_H$ (H). Since it is assumed that $\{h_k \sim \mathcal{CN}(0,\beta_k I), \forall k\}$, the MMSE estimate $\hat{H}_{n,k}$ and the corresponding MSE $v_{nk}(\hat{H})$ in equations (27a) and (27b) are given, respectively, by $$\hat{H}_{n,k} = \frac{v_{nk}(\tilde{H})\tilde{H}_{nk}}{v_{nk}(\tilde{H}) + \beta_k} \tag{36a}$$

$$v_{nk}(\hat{H}) = \frac{v_{nk}(\tilde{H})}{v_{nk}(\tilde{H}) + \beta_k} \tag{36b}$$

Second, using equations (28a) and (28b), algorithm 400 performs the MMSE estimation of X from its AWGN observation $\tilde{X}$ and $P_X(X)$. Here, it is assumed that $\{X_{ki}, \forall k, i\}$ are drawn uniformly from a constellation. Detailed expressions of $\hat{X}_{ki}$ and $v_{ki}(\hat{X})$ for different constellation schemes can be found in C. K. Wen, C. J. Wang, S. Jin, K. K. Wong, and P. Ting, "Bayes-optimal joint channel-and-data estimation for massive MIMO with low-precision ADCs," IEEE Trans. Signal Process., vol. 64, no. 10, pp. 2541-2556, May 2016, which is hereby incorporated by reference herein in its entirety.

Unlike R-ALS algorithm 300 that uses pilot symbols to estimate $\Gamma$ in equation (15) after obtaining U* and V*, BiG-AMP algorithm 400 can use pilot symbols to estimate H and D directly. Specifically, in equations (22), (25), and (28) of algorithm 400, $\{\hat{X}_{ki}, \forall k, 1 \leq i \leq T_p\}$ are always given by P in the iterative process and the corresponding variances are set as zeros $\{v_{ki}(\hat{X}) = 0, \forall k, 1 \leq i \leq T_p\}$.

In some embodiments, the complexity of BiG-AMP algorithm 400 per iteration is dominated by ten matrix multiplications as indicated by equations (22a), (22b), (22c), (22d), (25a), (25b), (26a), (26b), and (26c), each of which scales as $\mathcal{O}(N_a K T_c)$. Normally, ALS has higher complexity than BiG-AMP algorithm 400 per iteration. But for massive MIMO with $K << N_a$, $T_c$, it has been observed that the overall complexities of ALS and BiG-AMP algorithm 400 are comparable since BiG-AMP requires more iterations to converge than ALS does.

As shown in FIGS. 4A and 4B, 406-416 of FIGS. 4A and 4B can repeat until convergence of successive values of H and X. For example, when H and X for adjacent passes of the repeat-until loop in 306-320 each do not change by more than some threshold amount, convergence can be considered to have occurred. Any suitable threshold can be used, such as 0.0001.

In some embodiments, ADCs 112 of FIG. 1 can be low-resolution ADCs (LR-ADCs). A low-resolution ADC (LR-ADC) can be any suitable ADC having in some embodiments. ADCs 112 can be implemented using LR-ADCs to reduce the cost of implementing a system 100 in some embodiments.

In some embodiments, the effect of LR-ADCs can be modeled as a quantization function denoted as $\mathcal{Q}(\cdot)$. According to equation (2), the quantized signal $q[i] \in \mathbb{C}^{N_r \times 1}$ can be given by $$q[i] = \mathcal{Q}(y[i]) = \mathcal{Q}(W[i]r[i]), \quad 1 \leq i \leq T_c, \tag{37}$$

where $\mathcal{Q}(\cdot)$ applies component-wise to the entries of y[i]. In some embodiments, a uniform mid-rise quantizer can be employed in an LR-ADC. In some embodiments, when this is the case, $\mathcal{Q}(\cdot)$ applies to the real and imaginary parts of the complex signal y separately as $$Q(y) = \text{sign}(\text{Re}(y)) \cdot \left(\min\left\{\left\lceil \frac{|\text{Re}(y)|}{\Delta}\right\rceil, 2^{b-1}\right\} - \frac{1}{2}\right) \cdot \Delta + \tag{38}$$
$$j \cdot \text{sign}(\text{Im}(y)) \cdot \left(\min\left\{\left\lceil \frac{|\text{Im}(y)|}{\Delta}\right\rceil, 2^{b-1}\right\} - \frac{1}{2}\right) \cdot \Delta,$$

where b is the resolution of the LR-ADCs and $\Delta$ is the quantization stepsize.

For a uniform mid-rise quantizer with an input signal distributed as $\mathcal{N}(0,1)$, example values of stepsize $\Delta_b$ and minimum normalized MSE (NMSE) for different resolutions b can be as shown in the table of FIG. 5. The NMSE can be defined as NMSE=$E[|\mathcal{Q}(y)-y|^2]/E[|y|^2]$. Since the real and imaginary parts of y have the same average power, the stepsize can be chosen as $\Delta = \sqrt{P_y/2} \cdot \Delta_b$ with $P_y \triangleq E[y^2]$ in some embodiments.

Based on equations (9) and (37), Q and $Q^\Omega$ can be defined as $Q \triangleq \mathcal{Q}(R)$ and $Q^\Omega \triangleq \mathcal{P}_\Omega(Q)$. The entries of $Q^\Omega$ in $\Omega$ can be given by $\{q[i], i=1, \ldots, T_c\}$ and zeros otherwise. According to equations (2), (9), and (37), $Q^\Omega$ can be related to Z via the following likelihood:

$$P_{Q^\Omega|Z}(Q_{ni}^\Omega | Z_{ni}) = \begin{cases} Pr\{Q_{ni}^\Omega = Q(R_{ni}) | Z_{ni}\}, & (n,i) \in \Omega, \\ \mathbb{1}_{Q_{ni}^\Omega}, & (n,i) \notin \Omega, \end{cases} \tag{39}$$

with $$Pr\{Q_{ni}^\Omega = Q(R_{ni}) | Z_{ni}\} = Pr\{Q_{ni}^\Omega = Q(Z_{ni} + N_{ni}) | Z_{ni}\} \tag{40}$$
$$= \int_{n \in Q^{-1}(Q_{ni}^\Omega)} \mathcal{CN}(n; Z_{ni}, \sigma^2) dn,$$

where $Q^{-1}(Q_{ni}^\Omega)$ denotes the quantization interval corresponding to the quantized value $Q_{ni}^\Omega$.

Compared with $\{P_{Y^\Omega|Z}(Y_{ni}^\Omega | Z_{ni}), \forall (n,i) \in \Omega\}$ in equations (31), the likelihood $\{P_{Q^\Omega|Z}(Q_{ni}^\Omega | Z_{ni}), \forall (n,i) \in \Omega\}$ becomes nonlinear in equation (39). In some embodiments, BiG-AMP algorithm 400 can handle any continuous nonlinear likelihoods while R-ALS algorithm 300 cannot. In BiG-AMP algorithm 400 of FIGS. 4A and 4B, the posterior of Z at 410 can be modified as follows:

$$Z_{ni}^{post} = E[Z_{ni} | Z_{ni}^{pri}, v_{ni}^{pri}(Z), Q_{ni}^\Omega], \tag{41a}$$

$$v_{ni}^{post}(Z) = \text{Var}[Z_{ni} | Z_{ni}^{pri}, v_{ni}^{pri}(Z), Q_{ni}^\Omega], \tag{41b}$$

Specifically, for $(n,i) \notin \Omega$, the posterior is the same as the prior. For $(n,i) \in \Omega$, $Z_{ni}^{post}$ and $$Z_{ni}^{post} = Z_{ni}^{pri} + \frac{\text{sign}(Q_{ni}^\Omega) v_{ni}^{pri}(Z)}{\sqrt{2(v_{ni}^{pri}(Z) + \sigma^2)}} \cdot \frac{\phi(\eta_1) - \phi(\eta_2)}{\Phi(\eta_1) - \Phi(\eta_2)}, \tag{42a}$$

-continued $$v_{ni}^{post}(Z) = \frac{v_{ni}^{pri}(Z)}{2} - \frac{v_{ni}^{pri}(Z)/2}{v_{ni}^{pri}(Z)+\sigma^2} \left( \frac{\eta_1 \phi(\eta_1) - \eta_2 \phi(\eta_2)}{\phi(\eta_1) - \phi(\eta_2)} + \left(\frac{\phi(\eta_1) - \phi(\eta_2)}{\phi(\eta_1) - \phi(\eta_2)}\right)^2 \right),$$ (42b)

with $$\eta_1 = \frac{\text{sign}(Q_{ni}^\Omega) Z_{ni}^{pri} - \min\{|r_{b-1}|, |r_b|\}}{\sqrt{(v_{ni}^{pri}(Z)+\sigma^2)/2}},$$ (43a)

$$\eta_2 = \frac{\text{sign}(Q_{ni}^\Omega) Z_{ni}^{pri} - \max\{|r_{b-1}|, |r_b|\}}{\sqrt{(v_{ni}^{pri}(Z)+\sigma^2)/2}},$$ (43b)

where $[r_{b-1}, r_b]$ denotes the quantization interval corresponding to the quantized value $\text{Re}(Q_{ni}^\Omega)$. Since $\mathcal{Q}(\cdot)$ applies separately to the real and imaginary parts, calculating the complex-valued posterior in equation (41) can be decoupled into calculating two real-valued posteriors. To simplify the notation, $Z_{ni}^{pri}$, $Z_{ni}^{post}$ and $Q_{ni}^\Omega$ in equations (42) and (43) can be abused to denote $\text{Re}(Z_{ni}^{pri})$, $\text{Re}(Z_{ni}^{post})$, and $\text{Re}(Q_{ni}^\Omega)$, respectively. The imaginary part of $Z_{ni}^{pri}$ can be obtained by equations (42) and (43) in a similar way.

For a nonlinear function with a Gaussian input signal, Bussagang's theorem can be using in some embodiments to decompose an output signal into two parts: a linear transform of the input signal; and a distortion that is statistically uncorrelated to the input signal.

Before applying Bussagang's decomposition, in some embodiments, it can be assumed that the entries of y are i.i.d. complex Gaussian as $y \sim \mathcal{CN}(0, P_y I_{N_r \times N_r})$, where $P_y = \bar{\beta} + \sigma^2$ with $\bar{\beta} \triangleq \sum_{k=1}^K \beta_k$.

This assumption can be justified as follows:
1. Since the entries of x from K users are assumed i.i.d. with unit average power, $E[xx^H] = I_{K \times K}$. According to equation (1), $$E[rr^H] = E[(Hx+n)(Hx+n)^H]$$ (44a)

$$= E[HH^H] + \sigma^2 I_{N_a \times N_a}$$ (44b)

$$= (\bar{\beta} + \sigma^2) I_{N_a \times N_a},$$ (44c)

where the last equality is due to $\{h_k \sim \mathcal{CN}(0, \beta_k I), \forall k\}$. According to the central limit theorem, the entries of r are distributed as $r \sim \mathcal{CN}(0, P_r I_{N_a \times N_a})$ with $P_r \triangleq \bar{\beta} + \sigma^2$.

2. For the hybrid architecture with switches or phase shifters, W is formed by a set of $N_r$ row vectors randomly chosen from an $N_a \times N_a$ identity matrix or the DFT matrix, respectively. For both cases, $E[WW^H] = I_{N_r \times N_r}$. According to equations (2) and (44c), $$E[yy^H] = E[(Wr)(Wr)^H] = E[Wrr^H W^H]$$ (45a)

$$= (\bar{\beta} + \sigma^2) I_{N_r \times N_r}.$$ (46a)

Since W is unitarily invariant, $y \sim \mathcal{CN}(0, P_y I_{N_r \times N_r})$ with $P_y = P_r$.

Under the assumption made above, Bussagang's theorem can be applied to equation (37), and the index [i] in equation (37) dropped to simplify the notation, to get $$q = \mathcal{Q}(y) = Gy + \xi,$$ (46)

where $G \in \mathbb{R}^{N_r \times N_r}$ is chosen such that $\xi \in \mathbb{C}^{N_r \times 1}$ is statistically uncorrelated to y, i.e., $E[\xi y^H] = 0$. G can be calculated as $$G = \Sigma_{y,q}^H \Sigma_{y,y}^{-1},$$ (47)

where $\Sigma_{y,q}$ denotes the cross-correlation matrix between y and q and $\Sigma_{y,y}$ denotes the auto-correlation matrix of y.

Under the above assumption, $G = g I_{N_r \times N_r}$ with $$g = \frac{\Delta}{\sqrt{\pi P_y}} + \sum_{i=1}^{L_b - 1} \frac{2\Delta}{\sqrt{\pi P_y}} e^{-\frac{(\Delta \cdot i)^2}{P_y}},$$ (48)

where $L_b \triangleq 2^{(b-1)}$.

Substituting equation (48) into equation (46), the additive quantization noise model (AQNM) can be $$q = \mathcal{Q}(y) = gy + \xi.$$ (49)

Combing equations (49) and (2), $$q = gWHx + \eta,$$ (50)

where $\eta \triangleq gWn + \xi$ and $\xi = \mathcal{Q}(y) - gy$ as indicated by equation (49). Based on the above assumption, the entries of $\xi$ have zero mean and its auto-correlation matrix is given by $\Sigma_{\xi,\xi} = v_\xi I_{N_r \times N_r}$. While, generally, the elements of $\xi$ are non-Gaussian, in some embodiments, assuming that the elements of $\xi$ are Gaussian can greatly simplify the signal recovery in equation (50) and empirically cause little performance loss for massive MIMO systems with nonlinearities. If the elements of $\xi$ are assumed to be Gaussian, the uncorrelatedness between $\xi$ and y implies the independence due to the Gaussianity of y. As a result, $\eta$ can be approximated by AWGN and the nonlinear system model of equation (37) can be transformed into a linear model up to a constant scaling. Algorithms 300 and 400 can then be applied to equation (50). Specifically, $\tilde{q} \triangleq q/g$ can be defined as $$\tilde{q} = WHx + \tilde{\eta},$$ (51)

where $\tilde{\eta} \triangleq Wn + \xi/g$. With a Gaussian assumption, the entries of $\tilde{\eta}$ are distributed as $\mathcal{CN}(0, (v_\xi/g^2 + \sigma^2) I_{N_r \times N_r})$. Comparing equation (51) with equation (2), it is clear that algorithms 300 and 400 can be readily applied by replacing y and $\sigma^2$ with $\tilde{q}$ and $v_\xi/g^2 + \sigma^2$, respectively, in some embodiments. Note that g and $v_\xi$ are predetermined.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for recovering data symbols in a multiple-input, multiple-output (MIMO) receiver, comprising:
$N_a$ antennas that each have an output, that receive first signals corresponding to $N_p$ pilot symbols transmitted from each of K transmitters for a total of $N_p*K$ transmitted pilot symbols, and that receive second signals corresponding to a plurality of transmitted data symbols transmitted from the K transmitters, wherein $N_p$ is less than $N_a$, and wherein K is less than $N_a$;
an RF combiner having $N_a$ inputs and $N_r$ outputs, wherein each of the $N_a$ inputs is connected to the output of a unique one of the $N_a$ antennas;
$N_r$ RF chains, wherein each of the $N_r$ RF chains has an input connected to a unique one of the $N_r$ outputs of the RF combiner, wherein each of the $N_r$ RF chains has an output, and wherein $N_r$ is less than $N_a$;
b-bit analog to digital converters (ADCs), wherein each of the $N_r$ b-bit ADCs has an input connected to the output of a unique one of the $N_r$ RF chains, and wherein each of the $N_r$ b-bit ADCs has an output; and
a hardware processor coupled to the output of each of the $N_r$ b-bit ADCs and configured to:
receive first digital signals representing the $N_p*K$ transmitted pilot symbols;
receive second digital signals representing the plurality of transmitted data symbols; and
recover the plurality of transmitted data symbols using the second digital signals and no more pilot symbols than the $N_p*K$ transmitted pilot symbols represented by the first digital signals by performing low-rank matrix decomposition on the first digital signals and the second digital signals.

2. The system of claim 1, wherein $N_p$ equals K.

3. The system of claim 1, wherein $N_p$ is less than half of $N_a$.

4. The system of claim 1, wherein the RF combiner combines signals from the antennas using phase shifters.

5. The system of claim 1, wherein the RF combiner uses switches to couple the $N_r$ RF chains to $N_r$ of the $N_a$ antennas.

6. The system of claim 1, wherein b is less than 5.

7. The system of claim 1, wherein the hardware processor uses Bussgang's decomposition to linearize distortion in at least one of the first digital signals and the second digital signals.

8. The system of claim 1, wherein recovering the plurality of transmitted data symbols includes estimating a K×K ambiguity matrix using the first digital signals.

9. A method for recovering data symbols in a multiple-input, multiple-output (MIMO) receiver, comprising:
receiving, at $N_a$ antennas that each have an output: first signals corresponding to $N_p$ pilot symbols transmitted from each of K transmitters for a total of $N_p*K$ transmitted pilot symbols; and second signals corresponding to a plurality of transmitted data symbols transmitted from the K transmitters, wherein $N_p$ is less than $N_a$, and wherein K is less than $N_a$;
receiving, at a hardware processor, first digital signals representing the $N_p*K$ transmitted pilot symbols;
receiving, at the hardware processor, second digital signals representing the plurality of transmitted data symbols; and
recovering the plurality of transmitted data symbols using the second digital signals and no more pilot symbols than the $N_p*K$ transmitted pilot symbols represented by the first digital signals by performing low-rank matrix decomposition on the first digital signals and the second digital signals using the hardware processor.

10. The method of claim 9, wherein $N_p$ equals K.

11. The method of claim 9, wherein $N_p$ is less than half of $N_a$.

12. The method of claim 9, further comprising using Bussgang's decomposition to linearize distortion in at least one of the first digital signals and the second digital signals.

13. The method of claim 9, wherein recovering the plurality of transmitted data symbols includes estimating a K×K ambiguity matrix using the first digital signals.

14. A non-transitory computer-readable medium containing computer executable instructions that, when executed by a processor, cause the processor to perform a method for recovering data symbols in a multiple-input, multiple-output (MIMO) receiver, the method comprising:
receiving, at $N_a$ antennas that each have an output: first signals corresponding to $N_p$ pilot symbols transmitted from each of K transmitters for a total of $N_p*K$ transmitted pilot symbols; and second signals corresponding to a plurality of transmitted data symbols transmitted from the K transmitters, wherein $N_p$ is less than $N_a$, and wherein K is less than $N_a$;
receiving first digital signals representing the $N_p*K$ transmitted pilot symbols;
receiving second digital signals representing the plurality of transmitted data symbols; and
recovering the plurality of transmitted data symbols using the second digital signals and no more pilot symbols than the $N_p*K$ transmitted pilot symbols represented by the first digital signals by performing low-rank matrix decomposition on the first digital signals and the second digital signals.

15. The non-transitory computer-readable medium of claim 14, wherein $N_p$ equals K.

16. The non-transitory computer-readable medium of claim 14, wherein $N_p$ is less than half of $N_a$.

17. The non-transitory computer-readable medium of claim 14, wherein the method further comprises using Bussgang's decomposition to linearize distortion in at least one of the first digital signals and the second digital signals.

18. The non-transitory computer-readable medium of claim 14, wherein recovering the plurality of transmitted data symbols includes estimating a K×K ambiguity matrix using the first digital signals.

* * * * *